United States Patent

Agha et al.

[19]

[11] Patent Number: 6,044,461
[45] Date of Patent: Mar. 28, 2000

[54] COMPUTER SYSTEM AND METHOD OF SELECTIVELY REBOOTING THE SAME IN RESPONSE TO A SYSTEM PROGRAM CODE UPDATE

[75] Inventors: Salim A. Agha; Mark F. Diez; David H. Sandifer; Allan H. Trautman, all of Rochester, Minn.

[73] Assignee: International Business Machines Corporation, Armonk, N.Y.

[21] Appl. No.: 08/931,049

[22] Filed: Sep. 16, 1997

[51] Int. Cl.[7] .................................................. G06F 9/445
[52] U.S. Cl. .................................................. 713/1; 395/712
[58] Field of Search .................................... 713/1, 2, 100; 395/712, 700, 375; 709/220, 221, 222; 710/15; 364/492; 348/10

[56] References Cited

U.S. PATENT DOCUMENTS

| | | | |
|---|---|---|---|
| 5,408,624 | 4/1995 | Raasch et al. | 395/712 |
| 5,410,703 | 4/1995 | Nilsson et al. | 395/712 |
| 5,500,806 | 3/1996 | Bellin et al. | 364/492 |
| 5,761,530 | 6/1998 | Funahashi et al. | 710/15 |
| 5,771,064 | 6/1998 | Lett | 348/10 |
| 5,805,880 | 9/1998 | Pearce et al. | 713/2 |
| 5,841,991 | 11/1998 | Russell | 709/221 |
| 5,905,896 | 5/1999 | Delannoy | 395/712 |
| 5,922,072 | 7/1999 | Hutchinson et al. | 713/2 |
| 5,938,766 | 8/1999 | Anderson et al. | 713/100 |

*Primary Examiner*—Dennis M. Butler
*Assistant Examiner*—Rijue Mai
*Attorney, Agent, or Firm*—Wood, Herron, Evans, L.L.P.

[57] ABSTRACT

A computer system and method restart only affected system program code levels of a computer system in response to a program code update to one or more system program code levels in the computer system. An affected system program code level may be a system program code level that is modified by a program code update, as well as a system program code level that otherwise must be restarted in response to an update to another system program code level. By restarting only affected system program code levels in response to a program code update, the time required to perform many program code updates may be reduced. As a result, the downtime for the computer system may be minimized, thereby maximizing user access to enterprise-critical computer systems.

22 Claims, 3 Drawing Sheets

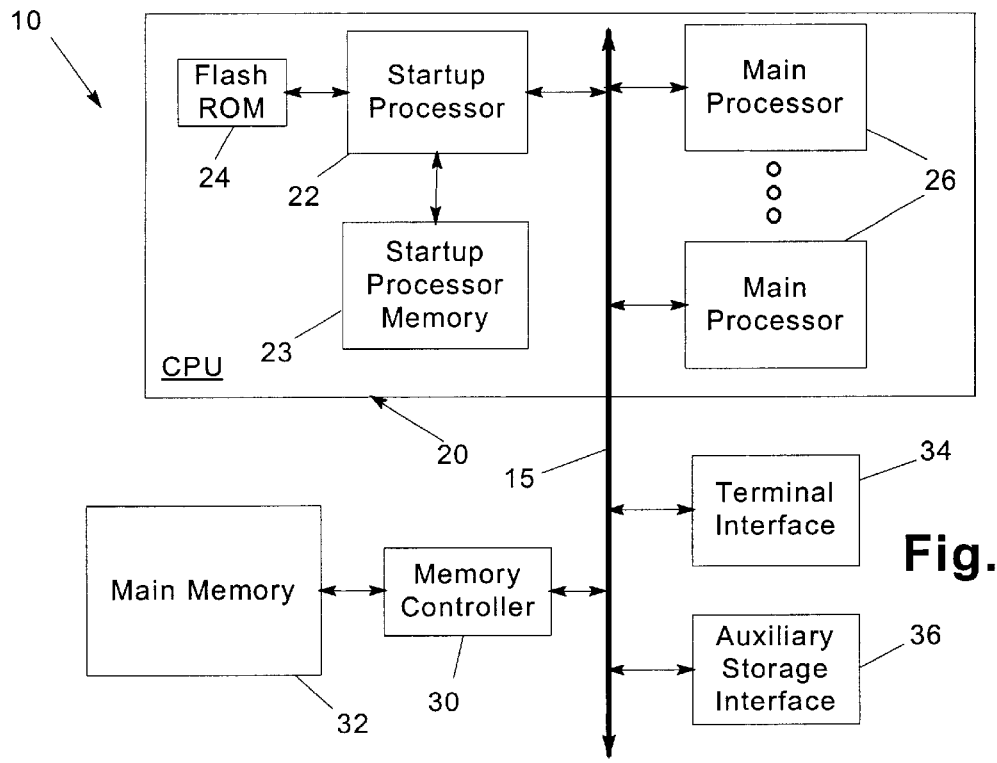
Fig. 1
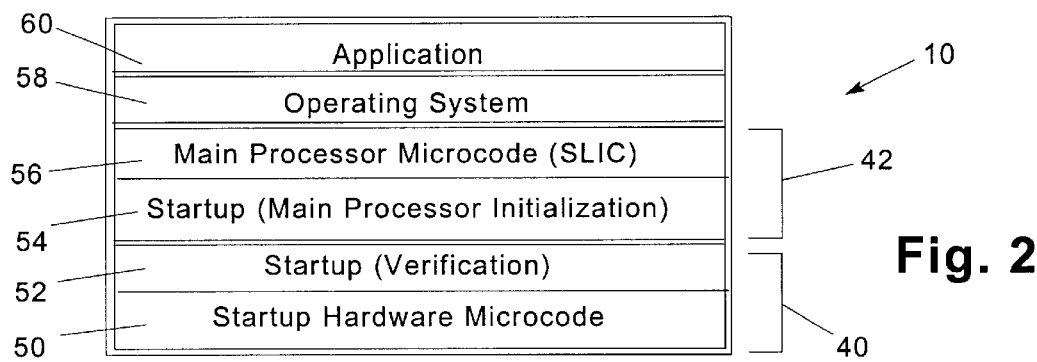
Fig. 2
Fig. 5
| Module | Load Phase |
|---|---|
| A | one |
| B | one |
| C | - |
| D | two |
| E | two |
| F | - |
| G | - |
Fig. 6
| Load Phase | Modified? |
|---|---|
| one | - |
| two | yes |

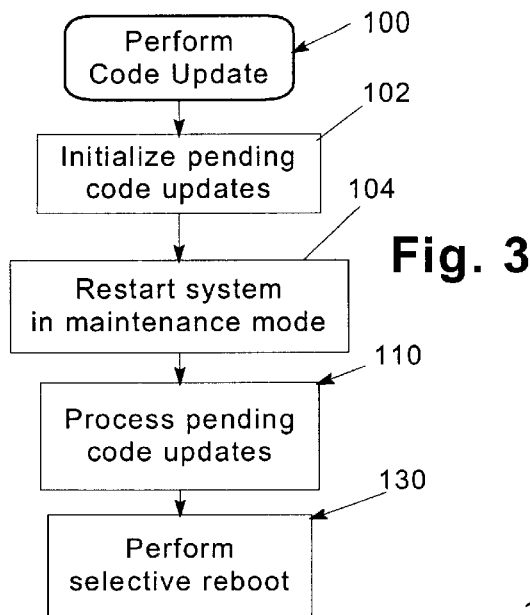
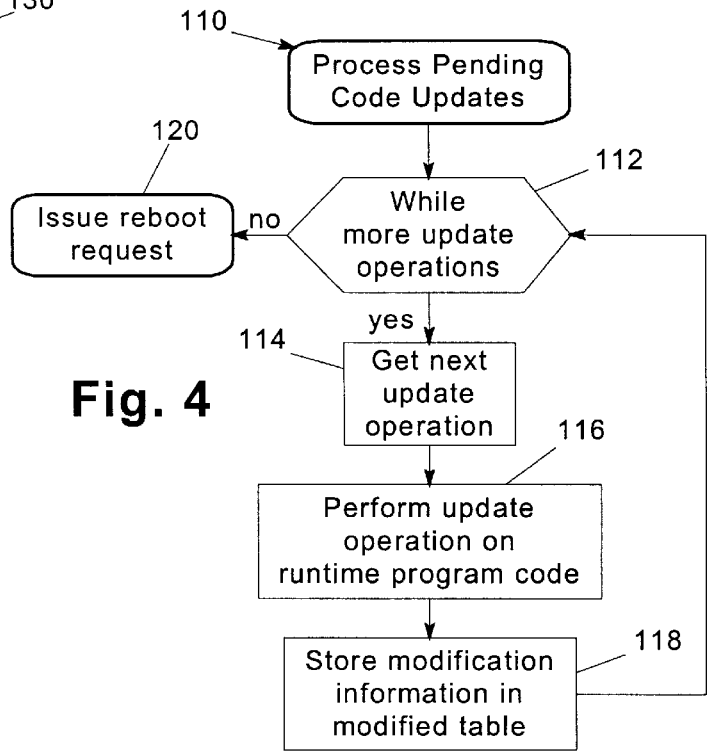
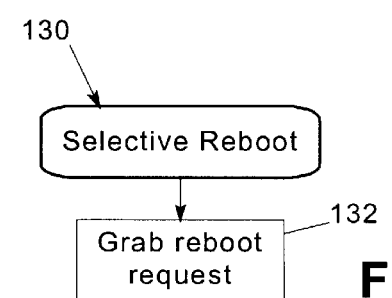
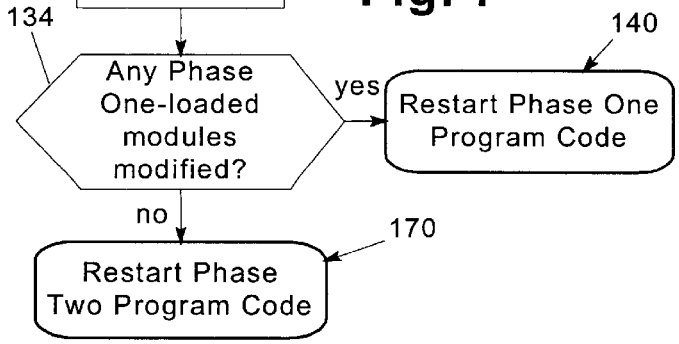

COMPUTER SYSTEM AND METHOD OF SELECTIVELY REBOOTING THE SAME IN RESPONSE TO A SYSTEM PROGRAM CODE UPDATE

FIELD OF THE INVENTION

The invention is generally related to computer systems, and more particularly, to manners and mechanisms for updating system program code stored therein.

BACKGROUND OF THE INVENTION

Many, if not all, computer systems need to be updated from time to time with new or modified program code—that is, the instructions that control the operation of the computer systems. For example, it may be necessary to update program code to fix errors, or to add new functionality to a computer system. A significant portion of the program code in a computer system is often referred to as system program code. The system program code generally includes the operating system of the computer system, as well as any lower-level program code utilized by the computer system, including microcode, basic input/output system (BIOS) program code, kernel program code, startup program code, etc.

Updating program code, and particularly system program code, can often be disruptive to users, since oftentimes access to a computer system must be restricted, or locked out, during a program code update. Some program code updates may be classified as immediate updates that can be performed immediately without disrupting a computer system. However, a significant number of program code updates are classified as delayed (or pending) updates, often because they require modification or access to currently active program code in a computer system. In such circumstances, a computer system typically must be shutdown and restarted, or "rebooted", to permit the delayed updates to be performed.

For a single-user computer system such as a desktop or portable computer, this may only be a minor inconvenience. On the other hand, for a multi-user computer system such as a mainframe computer, a midrange computer, a server, or the like, a large number of users may be affected. Especially given the increasingly important role of computer systems in an enterprise's day-to-day activities, any computer system downtime can significantly affect productivity. Consequently, it is often critically important to minimize computer system downtime whenever possible.

Computer systems typically have system program code that can be classified into one or more program code levels. Most computer systems at least have one or more levels of system program code, as well as application levels and dynamic library levels, among others. In addition, many computer systems may also have separate microcode levels that are initially executed by one or more processors or other hardware devices upon startup. With many computer systems, a number of program code levels are executed in sequence during startup, with each program code level performing self-initialization and loading the next level in the sequence.

As an example, the AS/400 midrange computer system from International Business Machines Corporation has multiple processors, known as main processors, that perform the primary processing tasks for the computer system. A separate startup, or service, processor is initially executed upon startup to handle a portion of system initialization and to initialize and start each main processor. The startup processor includes its own dedicated microcode stored in an electrically-rewriteable read-only memory such as a flash memory.

Upon initial startup, e.g., as a result of a reboot of the computer system, the startup processor initially executes power-on-boot microcode from its dedicated flash memory to initialize the startup processor and load a startup program from an external storage device. The startup program may be considered to occupy two program levels, with the first level performing self-verification of the startup processor, as well as additional verification of the main processors and a subset of the input/output hardware in the computer system. A second level of the startup program initializes each main microprocessor to permit each main processor to execute dedicated microcode, known as System Licensed Internal Code (SLIC), to perform additional initialization and to load the operating system program code. Next, the operating system program code is executed and initialized, and then the program code for various startup and support applications may also be executed. It is typically only after each of these program code levels has been restarted that users are granted access to the computer system. Typically, rebooting such a computer system can take five minutes or more.

A program code update to many of the program code levels of an AS/400 computer system often requires the computer system to be shutdown and restarted in a maintenance mode to permit updates to the program code to be performed. Then, once the updates have been performed, the computer system must be rebooted to operate in a runtime mode. In practice, the reboot process typically consumes much of the time required to perform program code updates.

A significant need therefore exists for a manner of reducing the time required to perform program code updates on a computer system. Specifically, a need exists for a manner of minimizing the time associated with rebooting a computer system as a result of such program code updates.

SUMMARY OF THE INVENTION

The invention addresses these and other problems associated with the prior art in providing a computer system and method in which only the affected system program code levels of a computer system are restarted in response to a program code update to one or more system program code levels in the computer system. One affected system program code level may be a system program code level that is modified by a program code update. In addition, an affected system program code level may also be a system program code level that otherwise must be restarted in response to an update to another system program code level, e.g., if the affected system program code is linked to an updated system program code level having new or updated program code. Often, but not always, an affected system program code level is a system program code level that is modified, or that is executed after another updated system program code level in a startup sequence.

By restarting only affected system program code levels in response to a program code update, the time required to perform many program code updates may be reduced. As a result, the downtime for the computer system may be minimized, thereby maximizing user access to enterprise-critical computer systems.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 1 is a block diagram of a computer system consistent with the principles of the invention.

FIG. 2 is a block diagram illustrating several program code levels in the computer system of FIG. 1.

FIG. 3 is a flowchart illustrating the program flow of a perform code update operation consistent with the invention.

FIG. 4 is a flowchart illustrating the program flow of the process pending code updates routine of FIG. 3.

FIG. 5 is a block diagram of a module table consistent with the invention.

FIG. 6 is a block diagram of a modified table consistent with the invention.

FIG. 7 is a flowchart illustrating the program flow of the selective reboot routine of FIG. 3.

DETAILED DESCRIPTION

Figure 8:
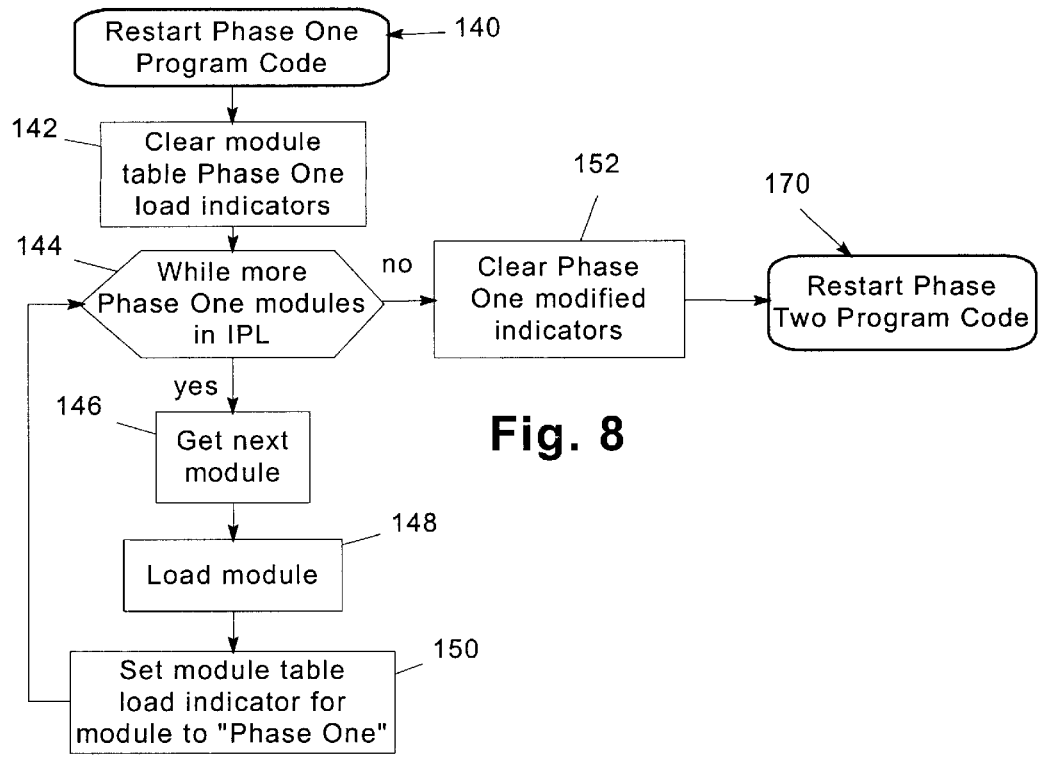
FIG. 8 is a flowchart illustrating the program flow of the restart phase one program routine called in FIG. 7.

Turning to the Drawing, wherein like numbers denote like parts throughout the several views, FIG. 1 shows a block diagram of a computer system 10 consistent with the invention. Computer system 10 may be, for example, an IBM AS/400 midrange computer system. However, those skilled in the art will appreciate that the various embodiments of the invention may be utilized in practically any computer system, regardless of whether the computer system is a complex multi-user networked computer system such as a midrange computer system, a mainframe computer system, or a server; or a single user system such as a personal computer or workstation. As shown in FIG. 1, computer system 10 includes a main or central processing unit (CPU) 20 connected through a system bus 15 to a memory controller 30, a terminal interface 34 and an auxiliary storage interface 36.

Terminal interface 34 allows system administrators and computer programmers to communicate with computer system 10, normally through programmable workstations. Auxiliary storage interface 36 allows computer system 10 to store and retrieve information from auxiliary storage such as magnetic disk, magnetic tape or optical storage devices. Memory controller 30, through use of a processor separate from CPU 20, moves information between main memory 32, auxiliary storage interface 36, and CPU 20.

While for the purposes of explanation, memory controller 30 is shown as a separate entity, those skilled in the art understand that, in practice, portions of the function provided by memory controller 30 may actually reside in the circuitry associated with CPU 20 and main memory 32. Further, while memory controller 30 is described as having responsibility for moving requested information between main memory 32, auxiliary storage interface 34 and CPU 20, those skilled in the art will appreciate that the mechanisms of the present invention apply equally to any storage configuration, regardless of the number and type of the storage entities involved.

CPU 20 is illustrated having a startup processor 22 with a dedicated startup processor random-access memory (RAM) 23 and a dedicated flash read only memory (ROM) 24. Processor 22 handles the principal initialization activities for computer system 10 upon restart. One or more main processors 26 handle the principal runtime activities for computer system 10, and are shown coupled to startup processor 22, as well as memory controller 30, terminal interface 34 and auxiliary storage interface 36, through system bus 15. It should be appreciated, however, that in practice, system bus 15 typically represents multiple dedicated, interconnected buses that are utilized between subsets of the various components to provide greater speed and throughput in the computer system.

Main memory 32 stores several software mechanisms (e.g., program code updates, some of the program code levels illustrated in FIG. 2, and module table 70 and modified table 75 illustrated in FIGS. 5 and 6—all of which are discussed below). Memory 30 also stores a multitude of other mechanisms and data that are not relevant to an understanding of the invention. It should be understood that main memory 32 will not necessarily always contain all parts of all described mechanisms at any given time. For example, copies of various data and mechanisms may be loaded from time to time into the hardware storage, registers, and/or caches in CPU 20 to execute, while other data and mechanisms may well be stored on magnetic or optical disk storage devices.

It will be appreciated that computer system 10 is merely an example of one system upon which routines consistent with the invention may execute. Further, as innumerable alternative system designs may be used, the invention should not be limited to any particular configuration shown herein.

It should also be appreciated that the routines executed to implement the illustrated embodiments of the invention, whether implemented as part of an operating system or a specific application, program, object, module or sequence of instructions, may be referred to generally as "computer programs". The computer programs typically comprise instructions that, when read and executed by one or more processors in the devices or systems in a computer system consistent with the invention, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, mass storage devices such as hard disk drives and the like, CD-ROM's, DVD's, magnetic tape, etc.; and transmission type media such as digital and analog communications links.

The program code executing on computer system 10 can generally be considered to include a plurality of program code "levels" that may be distinguished, for example, by virtue of their execution on different hardware devices (e.g., on a processor, or on support hardware such as interfaces and the like), their sequence of execution in the computer system, or the particular functionality that they possess. Program code levels typically can be defined hierarchically into a plurality of layers, with program code defined at lower layer providing functionality that is utilized by the program code defined at higher layers. In addition, each program code level in a layer is typically executed and initialized prior to those in higher level layers during startup of the computer system. Program code levels may also be defined as independent subsystems that can be independently stopped and started. Moreover, it is often the responsibility of program code at a given layer to load and execute the program code at a subsequent layer.

A subset of the program code on a computer system is the system program code that provides the bulk of the support software and functionality for the computer system. Typically, system program code includes the operating system and any lower-level program code utilized thereby, as well as any dedicated microcode for various hardware devices in the computer system.

As shown in FIG. 2, for the AS/400 midrange computer system 10 illustrated herein, separate program code levels 50–60 may be defined, of which levels 50–58 comprise system program code. An AS/400 midrange computer system generally operates in one of two modes, a maintenance mode and a runtime mode, also respectively referred to maintenance and runtime "sides". Program code updates that cannot be loaded dynamically, e.g., due to required links to currently active program code, are handled as pending program code update operations that require the computer system to be restarted in the maintenance mode prior to performing the program code updates. Upon startup in the maintenance mode, a link loader is executed that processes an initial program load (IPL) file to perform the pending program code update operations. Once the operations are performed, the system is then restarted in the runtime mode with the program code updates in place.

During startup in the runtime mode, the system lowest program code level, startup hardware microcode level 50 shown in FIG. 2, is loaded from dedicated flash memory 24 for execution by startup processor 22. The hardware microcode for the startup processor typically performs some self-verification and then loads a startup program (defined at levels 52 and 54) from mass storage into startup processor memory 23.

The startup program loaded by the startup hardware microcode performs in a first, verification level 52, additional self-verification of the startup processor as well as the main processors 26 and a subset of the input/output hardware of the computer system (e.g., interfaces 34, 36). Next, in a second, main processor initialization level 54, the startup program initializes each main processor 26 to execute and load system microcode for the main processors (often referred to as system licensed internal code (SLIC)) defined at level 56. The system microcode is loaded into memory 32 from mass storage. The microcode at level 56 next loads and executed the operating system at level 58, among other functions. In addition, once the operating system is loaded and initialized, any necessary applications (level 60) may be loaded and initialized as desired.

It should be appreciated that the basic arrangement of program code levels in the AS/400 computer system, as well as the manner in which they are loaded and executed upon startup, are well known in the art. Moreover, it should be appreciated that these program code levels and manners of execution are specific to but one type of computer system, and that the number, types, and arrangements of program code levels may vary widely in different computer systems. Furthermore, it should be appreciated that the partitioning of program code in a computer system into various levels may be performed at various degrees of granularity (e.g., by combining levels or separating levels into multiple levels). Thus, the invention should not be limited to the particular hardware and/or software environments described herein.

It should also be appreciated that the description hereinafter focuses on the implementation of pending program code updates on an AS/400 system, and thus, the various routines described hereinafter specifically refer to the maintenance and runtime modes of the system. However, it should be appreciated that separate maintenance and runtime modes are not utilized on many computer systems, and thus, the invention should not be limited to use only with systems incorporating the separate modes.

With conventional computer systems such as the AS/400 computer system, any update to any system program code level requires a full reboot of the computer system. This full reboot is often time consuming and may greatly inconvenience a large number of users. Embodiments of the invention generally operate by performing a selective reboot in response to program code updates that restarts only program code levels that are affected by a program code update.

For example, FIG. 3 illustrates the basic flow of a code update operation at 100. Generally, prior to the code update operation, an operator has performed system commands that direct the computer system to perform one or more pending program code update operations, as is known in the art. In block 102, these pending code updates are initialized, or "staged", typically by storing the updated program code in the computer system workspace and marking the updated program code as pending. Next, in block 104, the computer system is restarted in a maintenance mode. Upon restart, a link loader is loaded and executed in a manner known in the art to process the pending code updates (typically identified in a specific IPL file) using a routine 110. Once the pending code updates are processed, the computer system is restarted in the runtime mode and a selective reboot routine 130 is executed to selectively reboot the computer system based upon the type of program code updates.

FIG. 4 illustrates process pending code updates routine 110 in greater detail. Routine 110 is executed by the link loader and related functions in the maintenance mode, and utilizes a module table 70 and a modified table 75, illustrated separately in FIGS. 5 and 6. Tables 70 and 75 store information that is utilized to determine which program code levels are affected by pending code updates. Consequently, during restart of the computer system in the runtime mode, it is possible to determine the levels of program code that are affected so that a suitable restart may be performed only for those affected program code levels.

In general, an affected program code level may be a program code level having a module that is modified (i.e., updated or added) by a program code update. In addition, an affected program code level may also be a program code level that otherwise must be restarted in response to an update to another program code level, e.g., if the affected program code is linked to an updated program code level having a module that is new or that has been modified. Often, but not always, an affected program code level is a program code level that is modified, or that is executed after another modified program code level in a startup sequence.

In the exemplary embodiment, program code levels are executed in sequence, and thus, only information regarding the lowest affected program code level need be maintained to ensure that all of the affected program code levels are restarted. The lowest affected program code level in this embodiment is generally indicated by the earliest "load phase" in which a module was loaded the last time the system was restarted. A load phase may include only one program code level, or may include multiple levels, consistent with the invention.

In particular, in the exemplary embodiment, the startup process may be partitioned into two load phases 40, 42 (as shown in FIG. 2), and thus, the load indicator in this embodiment may either be the first or second load phase, or a null value (indicating that the module is not loaded, e.g., for modules that are loaded only in particular hardware configurations). First load phase 40, also referred to as load phase one, includes startup hardware microcode level 50 and verification level 52 of the startup program. Second load phase 42, also referred to as load phase two, includes main processor initialization level 54 of the startup program and main processor microcode 56.

As shown in FIG. 5, module table 70 generally maintains a record of each available program code module in computer system 10. For each module, module table 70 maintains an entry including an identifier (e.g., identifiers A–G shown in column one) and a load phase indicator (column two). The identifier enables the entry for a given module to be located. The load phase indicator indicates when a module is loaded during startup of the computer system. It should be appreciated that some modules (e.g., modules C, F and G in FIG. 5) may not have load phase indicators, e.g., if they are not loaded in a particular hardware profile for the computer system.

As shown in FIG. 6, modified table 75 generally maintains a record for each load phase executed during restart of computer system 10. For each load phase, modified table 75 maintains an entry including an identifier (e.g., identifiers "one" and "two" shown in column one) and a modified indicator (column two). The identifier enables the entry for a given load phase to be located. The modified indicator indicates whether the program code within a load phase has been modified, either as a result of a module loaded during the load phase being updated through a pending program code update operation, or as a result of a new module loaded during the load phase being added as a new module to the computer system.

It should be appreciated that module table 70 and modified table 75 may be implemented using different data structures. For example, a single table may be used in the alternative, having an entry for each module in the computer system, and with each entry having an identifier, a modified indicator and a load phase indicator. The identifier would identify the module. The modified indicator would indicate if the module has been modified (updated or added), and the load phase indicator would indicate when, if at all, a module was loaded. The lowest affected program code level could be determined from such a table by finding the earliest load phase having a module that is modified and loaded during the load phase. Other data structures may also be used consistent with the invention.

Returning to FIG. 4, routine 110 begins in block 112 by processing each pending update operation in a loop designated by blocks 112–118, prior to issuing a reboot request in block 120. The reboot request may be an immediate (forced) reboot, or may be a delayed reboot that is implemented later.

As long as more pending update operations need to be processed, block 112 passes control to block 114 to retrieve the next update operation from the IPL file, then block 116 performs the update operation on the runtime program code, in a manner that is well known in the art. Consistent with the invention, an additional operation is performed for each update operation in block 118, where the modification information pertaining to affected program code levels is stored in modified table 75. In particular, for each module modified through an update to its program code, or through its addition to the computer system, the corresponding modified identifier for the load phase in which the module is loaded (which may obtained from module table 70) is set to "yes".

Control then returns to block 112 until all update operations have been processed. A reboot request is then issued in block 120, resulting in a restart of the computer system in the runtime mode, in a manner well known in the art.

FIG. 7 illustrates selective reboot routine 130 in greater detail. Routine 130 generally executes upon restart of computer system 10 in runtime mode, typically by "grabbing" the reboot request issued in block 120 of FIG. 4 and taking control of the startup process. In block 134, it is determined whether any phase one-loaded modules were updated while in the maintenance mode—typically by determining whether the modified indicator in the modified table entry for load phase one is a "yes". If so, a "deep" restart is performed by calling restart phase one program code routine 140. If not, a "shallow" restart is performed by calling restart phase two program code routine 170.

The program flow for a phase one restart is illustrated by routine 140 in FIG. 8, where the module table load indicators for all phase one modules are first cleared in block 142. Next, the runtime IPL is processed in a loop formed by blocks 144–150. As long as more phase one modules (typically those from levels 50 and 52 of FIG. 2) need to be loaded, block 144 passes control to blocks 146 and 148 to get the next module from the IPL and load the module into the computer system, in a manner well known in the art. Next, in block 150, the load indicator in the module table entry for the loaded module is set to "one" to indicate that the module was loaded during phase one of the restart process. Next, control returns to block 144 to process the remaining phase one modules in the runtime IPL. When all phase one modules have been processed, control is passed to block 152 to clear the modified indicator in the modified table entry for load phase one—indicating that the updates to the modules have now been activated in the computer system. Next, phase two of the restart process is implemented by calling restart phase two program code routine 170. Upon completion of routine 140, therefore, all phase one modules have been loaded into the computer system, and the module table identifies those modules that were loaded during this phase. The modified table also indicates through the cleared modified indicator that none of the phase one modules have unincorporated updates pending.

Figure 9:
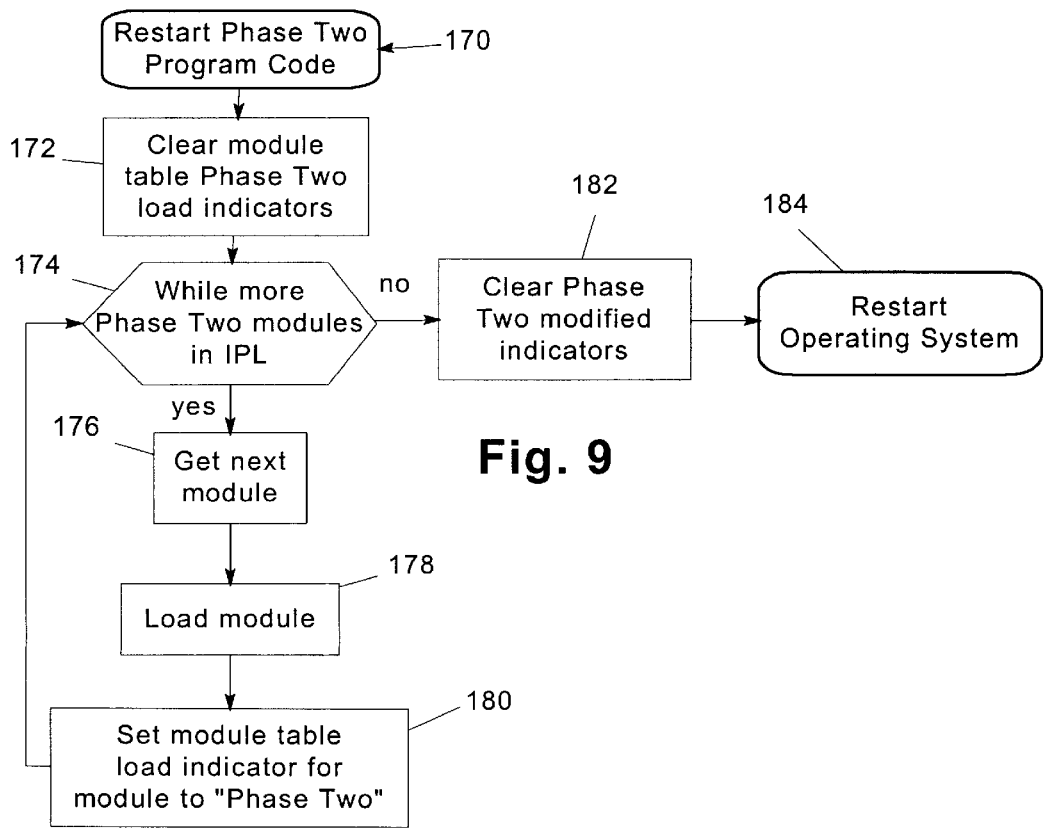
FIG. 9 is a flowchart illustrating the program flow of the restart phase two program code routine called in FIG. 7.

The program flow for a phase two restart is illustrated by routine 170 in FIG. 9, where the module table load indicators for all phase two modules are first cleared in block 172. Next, the runtime IPL is processed in a loop formed by blocks 174–180. As long as more phase two modules (typically those from levels 54 and 56 of FIG. 2) need to be loaded, block 174 passes control to blocks 176 and 178 to get the next module from the IPL and load the module into the computer system, in a manner well known in the art. Next, in block 180, the load indicator in the module table entry for the loaded module is set to "two" to indicate that the module was loaded during phase two of the restart process. Next, control returns to block 174 to process the remaining phase two modules in the runtime IPL. When all phase two modules have been processed, control is passed to block 182 to clear the modified indicator in the module table entry for load phase two—indicating that the updates to the modules have now been activated in the computer system. Next, the operating system is restarted in block 184. Upon completion of routine 170, therefore, all phase two modules have been loaded into the computer system, and the module table identifies those modules that were loaded during this phase. The module table also indicates through the cleared modified indicator that none of the phase two modules have unincorporated updates pending. Upon completion of routine 170, restart of the operating system and the remainder of computer system 10 is performed in a manner known in the art.

It should therefore be appreciated that, in the event that no phase one modules (i.e., modules from program code levels 50 or 52) are updated as a result of a pending program code update, phase one of the restart process (routine 140) is bypassed during restart of the computer system. In practice this has been found to reduce the restart process in the runtime mode about two minutes compared to the time required for a deep restart.

The selective reboot feature implemented by the embodiments of the invention therefore provides significant advantages over conventional designs in terms of reduced restart time, and as a result, reduced downtime and increased user productivity. Various modifications may be made to the described embodiments without departing from the spirit and scope of the invention. For example, it should be appreciated that the restart process may be partitioned into more than two phases, or that the phases may include different combinations and sequences of levels, depending upon the particular configuration of the computer system in which the program code is utilized. Other modifications may be made consistent with the invention, and thus, the invention lies solely in the claims hereinafter appended.

What is claimed is:

1. A method of selectively rebooting a computer system of the type including system program code from a plurality of system program code levels, the method comprising:
   (a) processing a pending program code update to update the system program code from at least one selected system program code level in the computer system;
   (b) determining which of the plurality of system program code levels are affected by the pending program code update; and
   (c) rebooting the computer system by restarting only the affected system program code levels.

2. The method of claim 1, wherein the plurality of system program code levels includes first and second system program code levels, the first system program code level defined at a lower layer in the computer system than the second system program code level.

3. The method of claim 2, wherein processing the pending program code update includes updating system program code in the first system program code level, and wherein rebooting the computer system includes restarting both the first and second system program code levels.

4. The method of claim 2, wherein processing the pending program code update includes updating system program code in the second system program code level, and wherein rebooting the computer system includes restarting only the second system program code level.

5. The method of claim 2, wherein the first system program code level includes microcode for a startup processor in the computer system, and wherein the second system program code level includes microcode for a main processor in the computer system.

6. The method of claim 1, further comprising intercepting a reboot request during startup of the computer system.

7. The method of claim 1, further comprising restarting the computer system in a maintenance mode, wherein processing the pending program code update is performed in the maintenance mode, and wherein rebooting the computer system includes restarting the computer system in a runtime mode.

8. The method of claim 1, wherein each of the plurality of system program code levels are loaded during one of a plurality of load phases, and wherein rebooting the computer system includes restarting only the load phases during which an affected program code level is loaded.

9. The method of claim 8, wherein processing the pending program code update includes updating a module of program code in the computer system, and wherein rebooting the computer system further includes:
   (a) loading the module associated with the pending program code update; and
   (b) storing, in a selected one of a plurality of entries in a table, the load phase during which the module was loaded.

10. The method of claim 9, wherein processing the pending program code update further includes indicating in the table that the load phase during which the module is loaded has been modified, and wherein determining the affected system program code level includes accessing the table to determine the earliest load phase modified by the pending program code update.

11. The method of claim 10, wherein the table includes a module table and a modified table, the module table including a plurality of module entries, each including an identifier and load phase indicator, and the modified table including a plurality of load phase entries, each including an identifier and a modified indicator, wherein storing the load phase during which the module was loaded includes storing the load phase in the load phase indicator in the associated module entry in the module table, and wherein processing the pending program code update includes setting the modified indicator in the associated load phase entry in the modified table to indicate that the load phase during which the module was loaded has been modified.

12. The method of claim 1, wherein each of the plurality of system program code levels is selected from the group consisting of startup hardware microcode, startup verification program code, startup main processor initialization program code, main processor microcode, operating system program code, and combinations thereof.

13. A computer system, comprising:
   (a) at least one memory storing system program code from first and second system program code levels; and
   (b) at least one processor, coupled to the memory and configured to execute the system program code stored thereon, the processor further configured to, in response to a pending update to the system program code from at least one of the first and second system program code levels, determine which of the first and second system program code levels are affected by the pending update, and, during reboot of the computer system, selectively restart only the affected system program code levels.

14. The computer system of claim 13, wherein the processor is further configured to process a pending program code update to update the system program code from at least one selected system program code level.

15. The computer system of claim 14, wherein the first system program code level is defined at a lower layer than the second system program code level, wherein the pending program code update is configured to update system program code in the first system program code level, and wherein the processor is configured to selectively restart both the first and second system program code levels during reboot of the computer system.

16. The computer system of claim 14, wherein the first system program code level is defined at a lower layer than the second system program code level, wherein the pending program code update is configured to update system program code in the second system program code level, and wherein the processor is configured to selectively restart only the second system program code level during reboot of the computer system.

17. The computer system of claim 13, wherein the at least one processor includes a startup processor and at least one main processor, wherein the memory includes a first memory coupled to the startup processor and a second memory coupled to the main processor, wherein the first system program code level includes hardware microcode stored in the first memory, and wherein the second system program code level includes startup program code stored in the second memory.

18. The computer system of claim 13, wherein each of the plurality of system program code levels is selected from the group consisting of startup hardware microcode, startup verification program code, startup main processor initialization program code, main processor microcode, operating system program code, and combinations thereof.

19. The computer system of claim 13, wherein the computer system is configured to operate in maintenance and runtime modes, wherein the memory includes a table storing an affected system program code level associated with updates to selected system program code modules, and wherein the processor is further configured to process a plurality of pending program code updates while the computer system is in the maintenance mode; and to restart the computer system in a runtime mode and determine the affected system program code level by accessing the table.

20. A program product, comprising:
   (a) a program configured to perform a method of selectively rebooting a computer system of the type including system program code from a plurality of system program code levels, the method comprising:
      (1) processing a pending program code update to update the system program code from at least one selected system program code level in the computer system;
      (2) determining which of the plurality of system program code levels are affected by the pending program code update; and
      (3) rebooting the computer system by restarting only the affected system program code levels; and
   (b) a signal bearing media bearing the program.

21. The program product of claim 20, wherein the signal bearing media comprises a recordable type media.

22. The program product of claim 20, wherein the signal bearing media comprises transmission type media.

* * * * *